(12) United States Patent
Hilliard et al.

(10) Patent No.: US 10,686,654 B2
(45) Date of Patent: Jun. 16, 2020

(54) CONFIGURATION MANAGEMENT AS A SERVICE

(71) Applicant: Verizon Patent and Licensing Inc., Arlington, VA (US)

(72) Inventors: James Z. Hilliard, Irving, TX (US); Andrew C. Austin, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 15/494,953

(22) Filed: Apr. 24, 2017

(65) Prior Publication Data

US 2018/0309624 A1 Oct. 25, 2018

(51) Int. Cl.
*H04L 12/24* (2006.01)
*H04L 29/08* (2006.01)

(52) U.S. Cl.
CPC ...... *H04L 41/0803* (2013.01); *H04L 41/0893* (2013.01); *H04L 41/22* (2013.01); *H04L 67/34* (2013.01); *H04L 41/00* (2013.01)

(58) Field of Classification Search
None
See application file for complete search history.

(56) References Cited

U.S. PATENT DOCUMENTS

| 8,775,577 | B1 * | 7/2014 | Alford | H04L 67/34 709/221 |
|---|---|---|---|---|
| 2013/0124807 | A1 * | 5/2013 | Nielsen | G06F 11/1438 711/162 |
| 2014/0040182 | A1 * | 2/2014 | Gilder | G06F 17/2264 707/602 |
| 2015/0317221 | A1 * | 11/2015 | Sampath | G06F 11/0793 714/4.11 |
| 2016/0212012 | A1 * | 7/2016 | Young | H04L 41/14 |
| 2016/0283281 | A1 * | 9/2016 | Antony | G06F 9/5055 |
| 2017/0170990 | A1 * | 6/2017 | Gaddehosur | H04L 12/4675 |
| 2017/0180346 | A1 * | 6/2017 | Suarez | G06F 9/45558 |

* cited by examiner

*Primary Examiner* — James A Edwards (57) ABSTRACT

A device can receive a request to generate a configuration management instance associated with a configuration management service. The device can generate the configuration management instance based on the request. The device can configure a set of member devices to be associated with the configuration management instance. The device can receive information associated with a configuration management action to be performed in association with a member device, of the set of member devices, of the configuration management instance. The device can perform the configuration management action in association with the member device, of the set of member devices, after receiving the information associated with the configuration management action.

20 Claims, 7 Drawing Sheets

CONFIGURATION MANAGEMENT AS A SERVICE

BACKGROUND

Infrastructure as code (IaC) is the process of managing and provisioning computer data centers through machine-readable definition files rather than physical hardware configuration or interactive configuration tools. Configuration management can refer to the process of provisioning, orchestrating, ensuring interoperability, etc. of devices associated with an entity, such as an organization, an enterprise, a business, a company, or the like.

DETAILED DESCRIPTION OF PREFERRED EMBODIMENTS

The following detailed description of example implementations refers to the accompanying drawings. The same reference numbers in different drawings can identify the same or similar elements.

In some cases, configuration management software is prone to introducing security risks and/or data vulnerability when used in association with multi-tenant environments. For example, different entities (i.e., "tenants") can access data associated with other entities in such cases. Some implementations described herein reduce such security risks and/or data vulnerability by generating and executing separate instances of configuration management software on a tenant basis. In this way, each configuration management instance can be prevented from communicating with other configuration management instances, thereby increasing security of data associated with each configuration management instance.

Additionally, some implementations herein provide a framework for providing configuration management a service. For example, a network operator can provide a configuration management service whereby the network operator manages devices associated with a customer (e.g., via configuration management software that is being executed by devices associated with the network operator). In this way, some implementations described herein enable the customer to manage a set of devices (e.g., a thousand devices, a million devices, etc.) using the configuration management service rather than manually configuring and provisioning the set of devices, which can be error prone, susceptible to security risks, or the like.

Figure 1A:
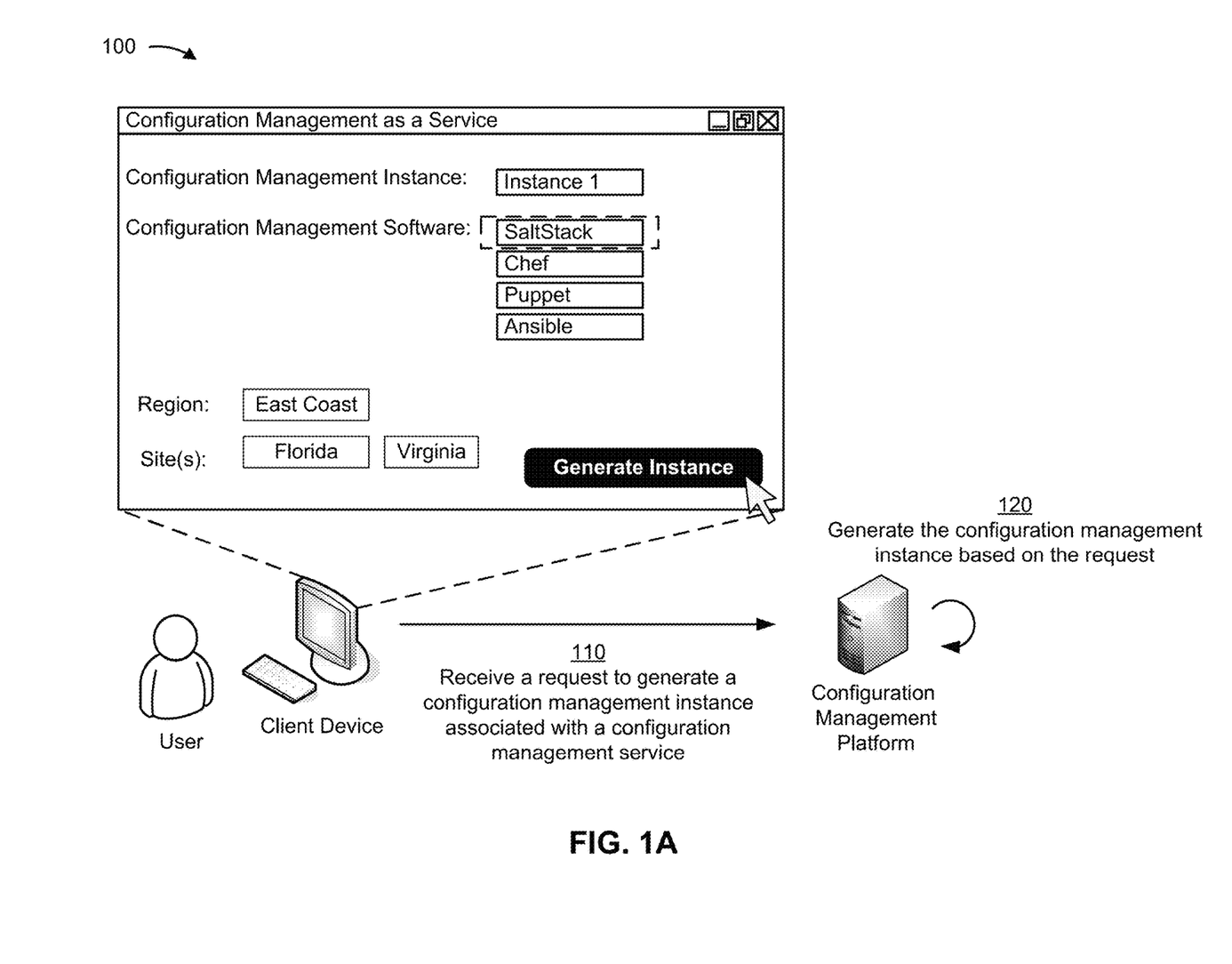
FIGS. 1A-1C are diagrams of an overview of an example implementation described herein.
Figure 1B:
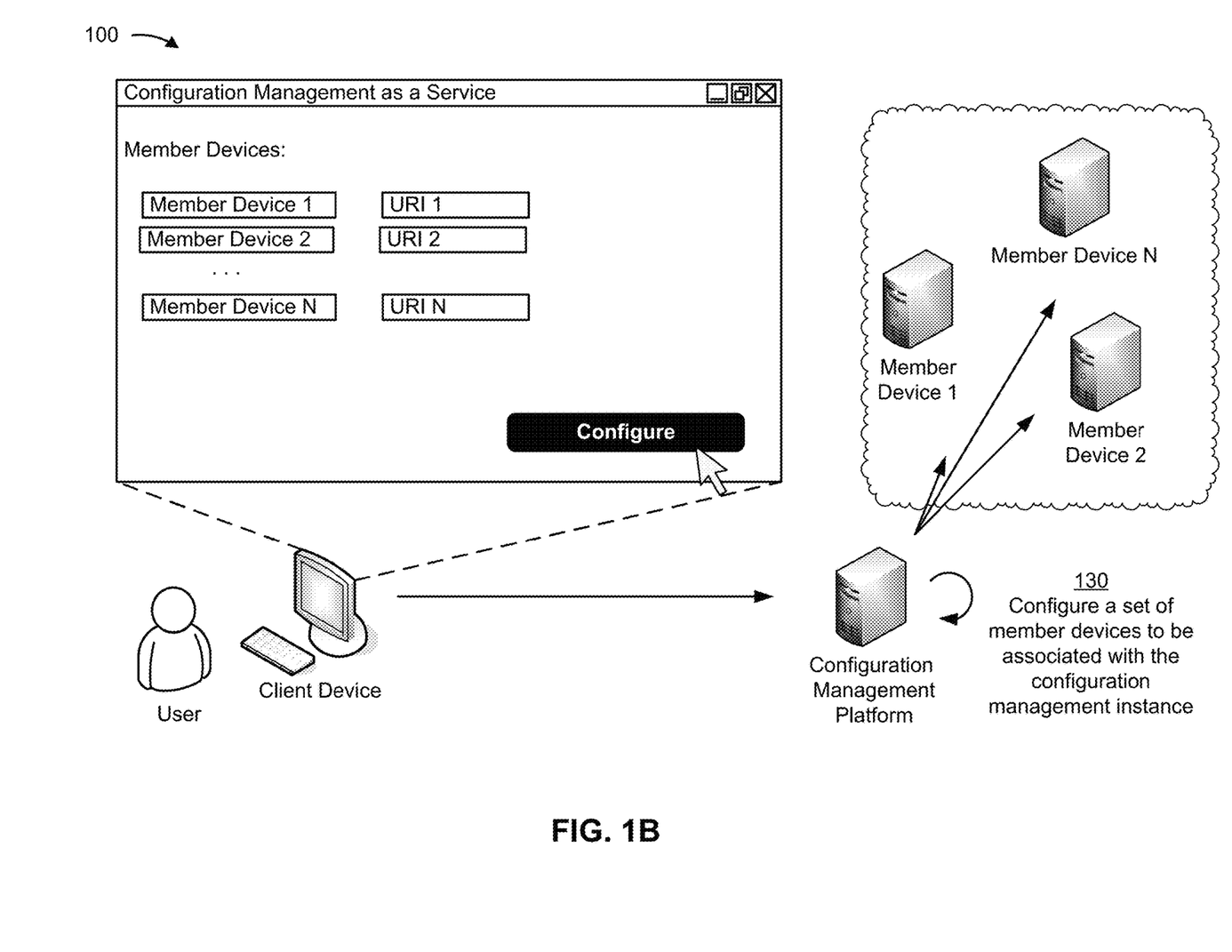
Figure 1C:
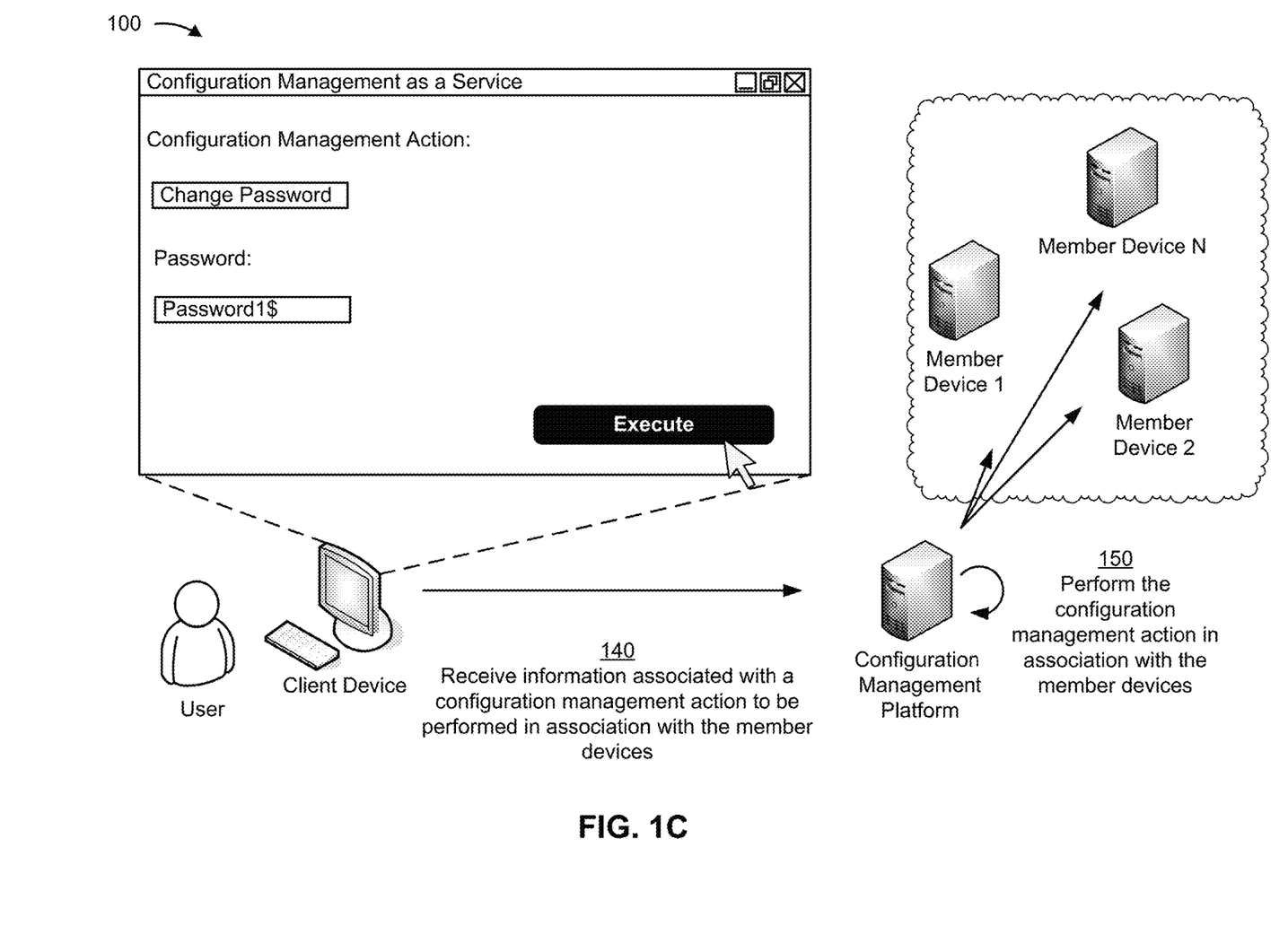

FIGS. 1A-1C are diagrams of an overview of an example implementation 100 described herein. As shown in FIG. 1A, and by reference number 110, a configuration management platform can receive a request to generate a configuration management instance associated with a configuration management service.

In some implementations, a configuration management service can refer to a service whereby a first entity provides, manages, etc. configuration management for a second entity. For example, a network operator associated with the configuration management platform can provide configuration management as a service to customers. In some implementations, configuration management can refer to a process of configuring, managing, orchestrating, etc. a set of member devices, such as server devices. In some implementations, a configuration management instance can refer to a particular set of member devices that are being managed.

As shown in FIG. 1A, a user can interact with a client device to specify a set of parameters associated with the configuration management service. For example, the user can specify a particular type of configuration management software (i.e., SaltStack) to be used in association with the configuration management instance, can specify a particular region (i.e., East Coast), and/or can specify particular sites (i.e., data centers) associated with the configuration management instance.

While implementations herein describe particular types of configuration management software (e.g., SaltStack, Chef, Puppet, Ansible, or the like), it should be understood that implementations described herein are applicable to other types of configuration management software. Indeed, some implementations described herein provide a framework that enables the configuration management service to be used in association with various types of configuration management software.

Additionally, while some implementations herein describe particular types of functionalities or roles associated with containers and/or member devices (i.e., salt masters, salt minions, or the like), it should be understood that other implementations include other types of functionalities or roles associated with containers and/or member devices based on particular types of configuration management software. In other words, various configuration management software can specify various functionalities and/or roles of devices. By being capable of executing various types of configuration management software, implementations described herein are capable of providing various functionalities and/or roles of the various types of configuration management software.

As further shown in FIG. 1A, and by reference number 120, the configuration management platform can generate the configuration management instance based on the request. For example, the configuration management platform can generate a container that executes the particular type of configuration management software that was specified in the request (i.e., SaltStack). In some implementations, the configuration management platform can configure the container to operate in a particular capacity, such as to operate as a Salt master (i.e., a device that manages member devices such as Salt minions). Additionally, or alternatively, the configuration management platform can allocate network addresses (e.g., an Internet Protocol (IP) address, a Media Access Control (MAC) address, or the like) to the container, and can associate the container with a configuration management instance identifier.

As shown in FIG. 1B, and by reference number 130, the configuration management platform can configure a set of member devices to be associated with the configuration management instance. For example, as shown, the user can interact with the client device to specify particular member devices that are to be managed as part of the configuration management instance. As shown, the user can specify particular uniform resource identifiers (URIs) associated with a set of member devices.

In some implementations, the configuration management platform can provide configuration information to the set of member devices. For example, configuration information can refer to information that enables member devices to join the configuration management instance. For example, the configuration information can include script files, binary files, or the like, that enable the set of member devices to join the configuration management instance. In some implementations, the configuration information can include information that identifies the particular type of configuration management software that is to be executed, can include information that enables the member devices to operate in a particular capacity (i.e., as Salt minions), and/or can include information that enables the member devices to communicate with the container that is executing the configuration management software and operating as the Salt master.

As shown in FIG. 1C, and by reference number 140, the configuration management platform can receive information associated with a configuration management action to be performed in association with the member devices. For example, as shown, the user can interact with the client device to specify a configuration management action (i.e., change password) and specify particular arguments associated with the configuration management action (i.e., the actual password).

As further shown in FIG. 1C, and by reference number 150, the configuration management platform can perform the configuration management action in association with the member devices. For example, the configuration management platform (i.e., the container that is executing the configuration management software) can provide, to the set of member devices, information that instructs the member devices to set the particular password. In this way, some possible implementations described herein provide a configuration management platform that provides configuration management as a service.

In other words, the configuration management platform can execute configuration management software and communicate with a set of member devices that are executing the configuration management software. Additionally, the configuration management platform can receive, from a client device associated with a customer, information associated with various configuration management actions to be performed, and perform the configuration management actions in association with the set of member devices that are associated with the customer.

As indicated above, FIGS. 1A-1C are provided merely as an example. Other examples are possible and can differ from what was described with regard to FIGS. 1A-1C.

While implementations herein describe particular types of configuration management software, and/or particular types of containers, it should be understood that implementations herein are applicable to other types of configuration management software and/or other types of containers or virtualization environments.

Figure 2:
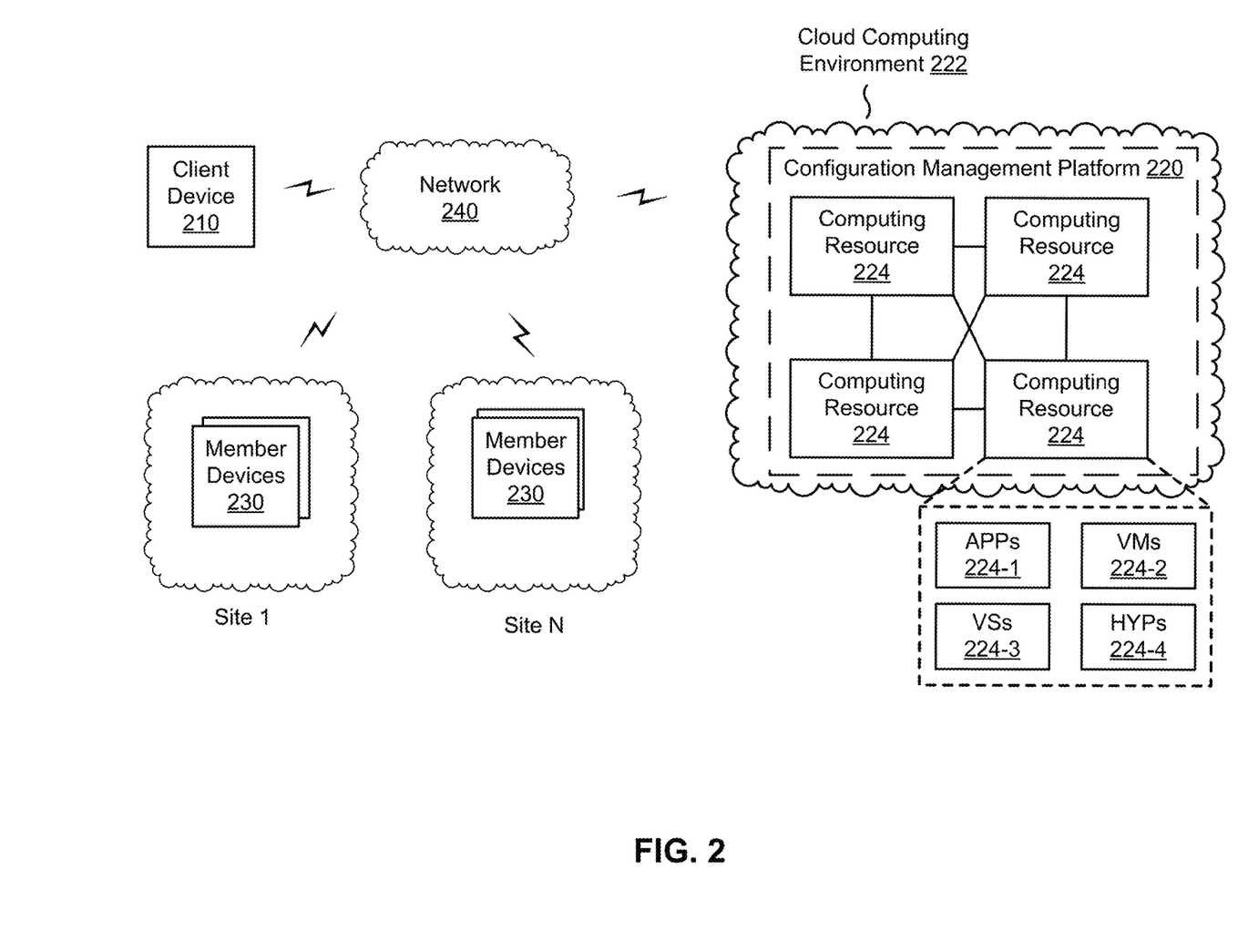
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a configuration management platform 220, a set of member devices 230, and a network 240. Devices of environment 200 can interconnect via wired connections, wireless connections, or a combination of wired and wireless connections.

Client device 210 includes one or more devices capable of receiving, generating, storing, processing, and/or providing information associated with a configuration management service. For example, client device 210 can include a communication and/or computing device, such as a mobile phone (e.g., a smart phone or a radiotelephone), a desktop computer, a laptop computer, a tablet computer, a handheld computer, a gaming device, a wearable communication device (e.g., a smart wristwatch or a pair of smart eyeglasses), or a similar type of device.

Configuration management platform 220 includes one or more devices capable of providing configuration management as a service. In some implementations, configuration management platform 220 can be designed to be modular such that certain software components can be swapped in or out depending on a particular need. As such, configuration management platform 220 can be easily and/or quickly reconfigured for different uses.

In some implementations, as shown, configuration management platform 220 can be hosted in cloud computing environment 222. Notably, while implementations described herein describe configuration management platform 220 as being hosted in cloud computing environment 222, in some implementations, configuration management platform 220 might not be cloud-based (i.e., can be implemented outside of a cloud computing environment) or can be partially cloud-based.

Cloud computing environment 222 includes an environment that hosts configuration management platform 220. Cloud computing environment 222 can provide computation, software, data access, storage, etc. services that do not require end-user (e.g., client device 210) knowledge of a physical location and configuration of system(s) and/or device(s) that hosts configuration management platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host configuration management platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that can be provided to or accessed by client device 210. Application 224-1 can eliminate a need to install and execute the software applications on client device 210. For example, application 224-1 can include software associated with configuration management platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., client device 210), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Member device 230 includes one or more devices capable of receiving, processing, storing, and/or providing information associated with a configuration management service. For example, member device 230 can include a computing device, such as a server, a router, a gateway, a switch, a firewall, a hub, a bridge, a security device, a load balancer, a line card, or a similar type of device. In some implementations, a configuration management instance can be associated with a set of member devices 230. For example, configuration management platform 220 can manage a set of member devices 230 that belong to a configuration management instance.

In some implementations, member devices 230 can be associated with different regions. For example, a region can refer to a geographic area (e.g., east coast, mid-atlantic, mid-west, west coast, etc.). Additionally, or alternatively, member devices 230 can be associated with different sites (e.g., data centers) associated with particular geolocations. In some implementations, a region can include a set of sites.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
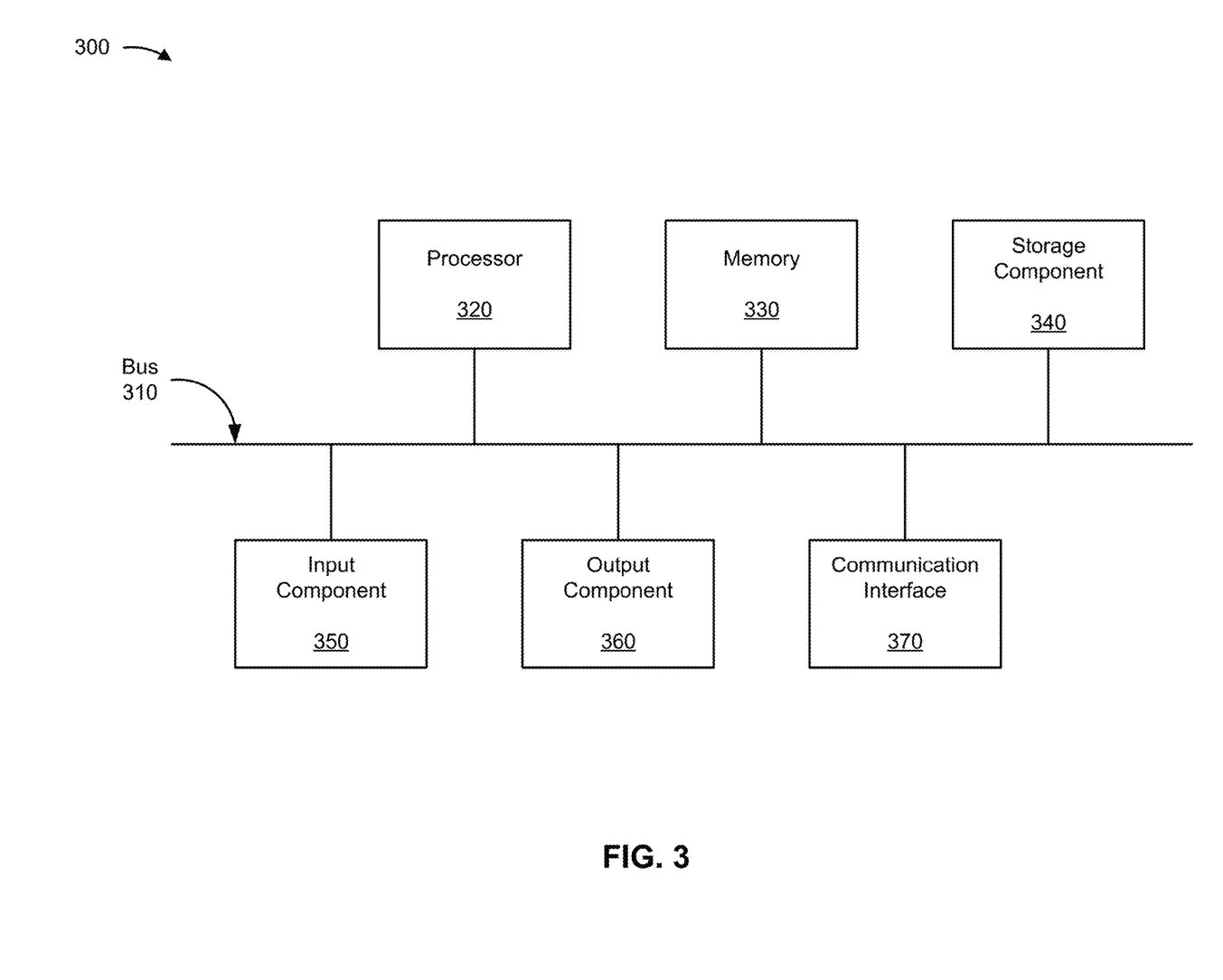
FIG. 3 is a diagram of example components of one or more devices of FIG. 2.

FIG. 3 is a diagram of example components of a device 300. Device 300 can correspond to client device 210, configuration management platform 220, and/or member device 230. In some implementations, client device 210, configuration management platform 220, and/or member device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
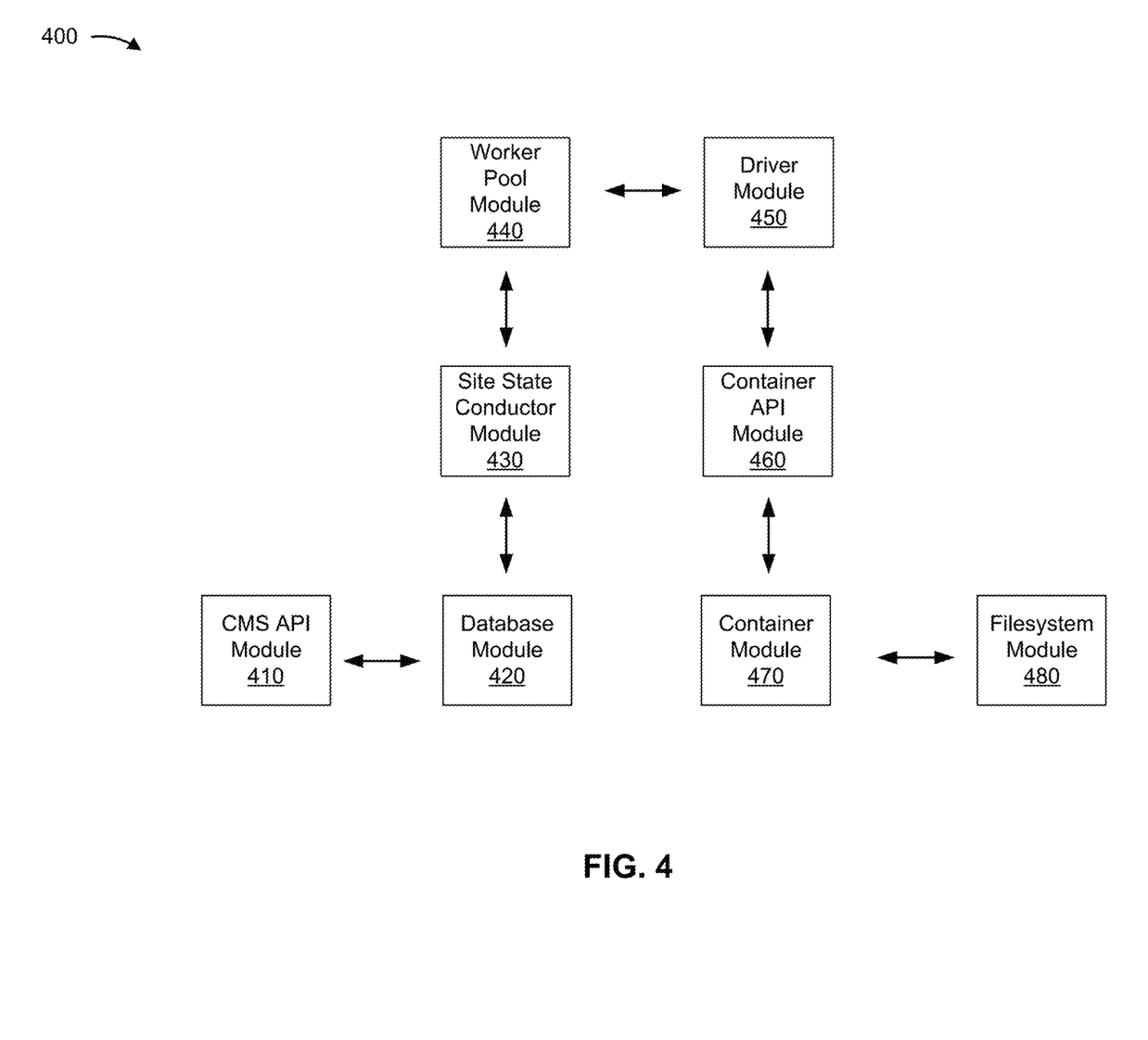
FIG. 4 is a diagram of example functional modules of one or more devices of FIG. 2.

FIG. 4 is a diagram of example functional modules of a device 400. Device 400 can correspond to configuration management platform 220. In some implementations, configuration management platform 220 can include one or more devices 400 and/or one or more functional modules of device 400. In some implementations, configuration management platform 220 can include a set of devices 400 that correspond to a set of sites.

As shown in FIG. 4, device 400 can include one or more functional modules, such as a configuration management service (CMS) application programming interface (API) module 410, a database module 420, a site state conductor module 430, a worker pool module 440, a driver module 450, a container API module 460, a container module 470, and a filesystem module 480. Each of these functional modules can be implemented by one or more processors (e.g., in hardware, firmware, or software executing on hardware).

CMS API module 410 includes a module that can receive, from client device 210 (e.g., via a web API), requests to perform configuration management actions (e.g., create configuration management instances, delete configuration management instances, or the like). Additionally, or alternatively, CMS API module 410 can create tasks associated with the requests, and provide, to database module 420, information associated with the tasks. Additionally, or alternatively, CMS API module 410 can provide, to client device 210, information that identifies states of the tasks.

Database module 420 includes a module that can store information associated with tasks and states of the tasks (e.g., incomplete, ready for execution, pending, etc.). For example, database module 420 can receive, from CMS API module 410, information associated with a task, and store a state associated with the task.

In some implementations, database module 420 can store information associated with global data, regional data, and/or site data. In some implementations, global data can refer to data that is associated with an account of an entity that is utilizing configuration management as a service, and can be stored by multiple database modules 420 (e.g., associated with different regions and/or sites). In some implementations, regional data can refer to data that is applicable to a particular region and/or a set of sites associated with the region. For example, regional data can include information associated with configuration management instances, member devices 230, configuration management commands, configuration management repository information, or the like, that are associated with a particular region. In some implementations, site data can refer to data that is associated with a particular site.

Site state conductor module 430 includes a module that can query database module 420 and identify tasks that are associated with configuration management actions. Additionally, or alternatively, site state conductor module 430 can identify tasks that are associated with particular states and instruct worker pool module 440 to execute the tasks based on the particular states.

Worker pool module 440 includes a module that can execute tasks associated with site state conductor module 430. For example, worker pool module 440 can identify tasks to be executed, schedule the tasks to be executed, and/or execute the tasks.

Driver module 450 includes a module that can interface with particular configuration management software (e.g., SaltStack, Puppet, Chef, Ansible, etc.). In some implementations, worker pool module 440 can execute methods associated with driver module 450 to execute tasks associated with configuration management actions that are to be implemented in association with particular configuration management software.

In some implementations, driver module 450 can include a set of drivers. In some implementations, a driver can include code that includes a defined interface to execute particular tasks. For example, driver module 450 can include a set of drivers to create, modify, delete, etc. configuration management instances. Additionally, or alternatively, driver module 450 can include a set of drivers to perform other types of configuration management actions, such as execute commands, declare state information, or the like. In some implementations, driver module 450 can include a set of drivers that correspond to a set of types of configuration management software.

Container API module 460 includes a module that can receive information from driver module 450 (e.g., via an API call), and provide the information to container module 470.

Container module 470 includes a module that can execute containers. As used herein, a container can refer to an application, that includes code, system tools, system libraries, etc., that is executed by a host device and that can share access to a kernel of an operating system of the host device with other containers (e.g., using operating system level virtualization). In other words, a container can include a self-contained execution environment, such as a Linux container, a Docker container, a VMware container, an open container, a virtual machine, an application package, another type of virtualization mechanism, or the like.

In some implementations, container module 470 can execute particular configuration management software. For example, container module 470 can execute SaltStack, Puppet, Chef, etc. In some implementations, different driver modules 450 can interface with different container modules 470. In other words, different driver modules 450 of configuration management platform 220 enable configuration management platform 220 to interface with container modules 470 and/or member devices 230 that are executing particular configuration management software.

Filesystem module 480 includes a module that can provide storage for configuration management instance data (e.g., data that is associated with a particular configuration management instance, data that is associated with a set of configuration management instances, global data, regional data, or the like). For example, filesystem module 480 can protect data through various mechanisms and/or techniques, such as redundancy, replication, backup, or the like.

In some implementations, CMS API module 410, database module 420, site state conductor module 430, worker pool module 440, driver module 450, container API module 460, container module 470, and/or filesystem module 480 can communicate via APIs (e.g., RESTful APIs, or the like), messaging queues, or the like.

The number and arrangement of functional modules shown in FIG. 4 are provided as an example. In practice, device 400 can include additional functional modules, fewer functional modules, different functional modules, or differently arranged functional modules than those shown in FIG. 4. Additionally, or alternatively, a set of functional modules (e.g., one or more functional modules) of device 400 can perform one or more functions described as being performed by another set of functional modules of device 400.

Figure 5:
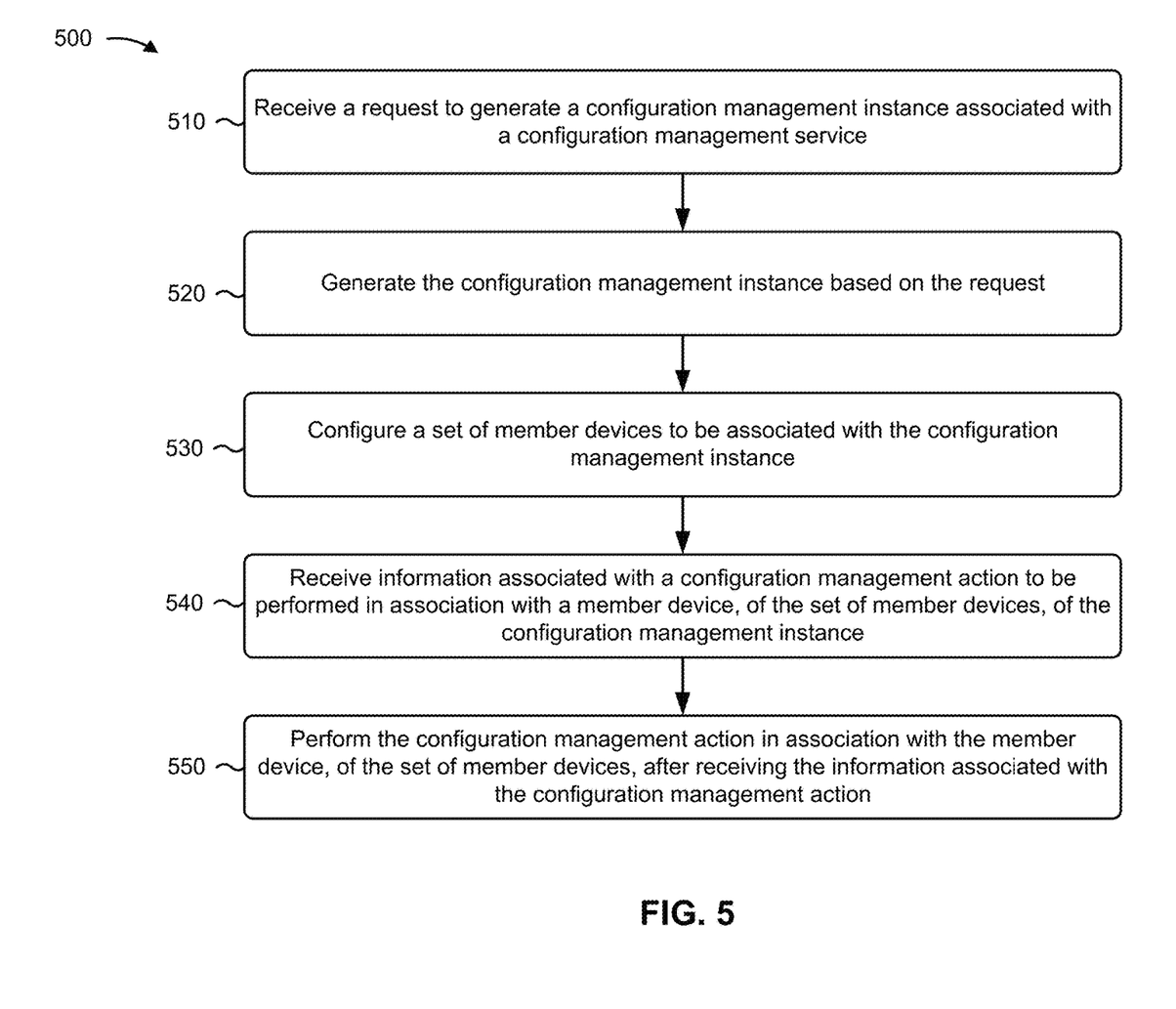
FIG. 5 is a flow chart of an example process for providing configuration management as a service.

FIG. 5 is a flow chart of an example process 500 for providing configuration management as a service. In some implementations, one or more process blocks of FIG. 5 can be performed by configuration management platform 220. In some implementations, one or more process blocks of FIG. 4 can be performed by another device or a group of devices separate from or including configuration management platform 220, such as client device 210 and/or member device 230. In some implementations, one or more process blocks of FIG. 5 can be performed by a particular module of device 400 or a group of modules of device 400.

As shown in FIG. 5, process 500 can include receiving information associated with a request to generate a configuration management instance associated with a configuration management service (block 510). For example, configuration management platform 220 can provide configuration management as a service, and receive, from client device 210, information associated with a request to generate a configuration management instance associated with the configuration management service.

In some implementations, a configuration management service can refer to a service whereby a first entity provides, manages, etc. configuration management for a second entity. In some implementations, configuration management can refer to a process of configuring, managing, orchestrating, etc. a set of member devices 230. For example, configuration management can enable thousands, millions, etc. of member devices 230 to be configured, managed, orchestrated, or the like. As a particular example, an entity can utilize configuration management to install a particular version of software on thousands, millions, etc. of member devices 230 via a set of configuration management commands instead of manually configuring each member device 230 respectively. While particular configuration management actions are described herein, it should be understood that configuration management can be used to perform a variety of configuration management actions. In other words, a configuration management action can refer to an action that can be performed using a particular configuration management software. In this way, implementations herein are applicable to a variety of actions associated with various types of configuration management software.

In some implementations, a configuration management instance can refer to a set of member devices 230 that are being managed as part of a configuration management service. In other words, each member device 230 of a configuration management instance can be configured, provisioned, managed, etc. in a similar manner.

In some implementations, client device 210 (e.g., which might have received an input from a user associated with an entity that is utilizing the configuration management service) can provide, to configuration management platform 220, a request to generate a configuration management instance.

In some implementations, a request to generate a configuration management instance can include information that identifies particular configuration management software to be executed. For example, the request can include information that identifies a particular type of configuration management software, such as SaltStack, Puppet, Chef, Ansible, or the like.

In some implementations, a request to generate a configuration management instance can include information that identifies a particular region associated with the configuration management instance, a particular site associated with the configuration management instance, and/or the like. For example, the configuration management instance can include a set of member devices 230 that are associated with a particular region, that are associated with a particular site, or the like.

In some implementations, a request to generate a configuration management instance can include information that identifies a number of copies of the configuration management instance that are to be generated. As an example, multiple copies of the configuration management instance can be generated, thereby enabling high-availability of services offered by member devices 230, redundancy, etc.

In some implementations, CMS API module 410 can receive, from client device 210 via a web API, the request to generate the configuration management instance. Additionally, or alternatively, CMS API module 410 can create a number of tasks associated with the request, and provide, to database module 420, information associated with the tasks. For example, in situations where multiple configuration management instances are to be generated, CMS API module 410 can create a number of tasks that correspond to the multiple configuration instances. In some implementations, database module 420 can store information associated with the tasks and respective states associated with the tasks (e.g., pending, awaiting execution, or the like). Additionally, or alternatively, CMS API module 410 can provide, to client device 210 via a web API, information that identifies the states of the tasks (e.g., to notify a user that the tasks are pending).

In some implementations, configuration management platform 220 can receive the request to generate the configuration management instance, and generate the configuration management instance, as described below.

As further shown in FIG. 5, process 500 can include generating the configuration management instance based on the request (block 520). For example, configuration management platform 220 can generate a container that executes configuration management software.

In some implementations, configuration management platform 220 can generate a container that executes a particular type of configuration management software associated with the request. As an example, in situations where the request includes information identifying that SaltStack is to be the configuration management software, configuration management platform 220 can generate a container that executes SaltStack. Additionally, or alternatively, configuration management platform 220 can configure the container to operate in association with a particular role. Continuing with the above example, configuration management platform 220 can configure the container to provide Salt master functionality (e.g., functionality to control, manage, etc. member devices 230 (i.e., Salt minions)).

In some implementations, configuration management platform 220 can configure the container with particular network addresses, such as an IP address, a MAC address, or the like. In some implementations, configuration management platform 220 can associate a configuration management instance identifier with the container and/or the configuration management instance.

In some implementations, configuration management platform 220 can generate a set of containers that correspond to a set of configuration management instances. For example, as described elsewhere herein, multiple copies of the configuration management instance can be generated in association with different regions, different sites, or the like. As an example, in situations where eight different sites are to be configured, configuration management platform 220 can generate eight different containers that correspond to the eight different sites (i.e., are being executed by computing resources 224 associated with the eight different sites).

In some implementations, site state conductor module 430 can query database module 420 and identify a set of tasks associated with generating the configuration management instances. For example, site state conductor module 430 can identify tasks that are associated with particular states (e.g., pending) and instruct worker pool module 440 to execute the tasks. Additionally, or alternatively, worker pool module 440 can instruct driver module 450 to execute particular drivers that can generate the configuration management instances. As an example, driver module 450 can execute drivers that can generate configuration management instances associated with the particular type of configuration management software.

In some implementations, driver module 450 can provide, to container module 470 via container API module 460, an instruction to execute containers associated with the configuration management instances. In some implementations, container module 470 can execute the containers, and provide, to database module 420, information that identifies that the containers were generated. Additionally, or alternatively, database module 420 can update states associated with the set of tasks (e.g., from pending to complete). Additionally, or alternatively, CMS API module 410 can provide, to client device 210, information that identifies the updated states (e.g., to notify the user of the updated state).

In this way, configuration management platform 220 can generate a container that is executing a particular type of configuration management software, and is operating in a particular capacity. Additionally, in this way, member devices 230 can be added to the configuration management instance, thereby enabling the member devices 230 to be managed by the container.

As further shown in FIG. 5, process 500 can include configuring a set of member devices to be associated with the configuration management instance (block 530). For example, configuration management platform 220 can receive information that identifies member devices 230, and configure the member devices 230 to join the configuration management instance.

In some implementations, configuration management platform 220 can provide, to member device 230, configuration information that enables member device 230 to join the configuration management instance. For example, the configuration information can include script files, binary files, or the like, that enable member device 230 to join the configuration management instance.

In some implementations, configuration information can include information that enables member device 230 to install the particular type of configuration management software that is being executed by the container. Additionally, or alternatively, configuration can include information that enables member device 230 to operate in a particular capacity. As a particular example, in situations where the configuration management software is SaltStack, the configuration information can enable member device 230 to operate as a Salt minion.

In some implementations, configuration information can include information that identifies a network address associated with the container that is executing the configuration management software. For example, the configuration information can identify an IP address, a MAC address, or the like, of the container. Additionally, or alternatively, configuration information can include information that identifies a configuration management instance identifier.

In some implementations, member device 230 can be configured to join the configuration management instance based on an automatic configuration procedure. In some implementations, configuration management platform 220 can receive, from client device 210, information that identifies a set of member devices 230 that are to be configured. For example, configuration management platform 220 can receive information that identifies member device 230, such as a device identifier, a uniform resource identifier (URI), a uniform resource locator (URL), an API href attribute, or the like.

In some implementations, and as part of the automatic configuration procedure, configuration management platform 220 can provide, to member device 230, configuration management instance metadata based on receiving the information that identifies member device 230. Additionally, or alternatively, member device 230 can receive the configuration instance metadata and receive an instruction to perform a reboot. Additionally, or alternatively, member device 230 can perform a reboot and a run a first boot script that identifies the configuration instance metadata and/or a configuration token associated with the configuration instance metadata. In some implementations, member device 230 can provide, to configuration management platform 220, a request for configuration information based on identifying the token. In some implementations, configuration management platform 220 can receive the request, and provide, to member device 230, configuration information, thereby enabling member device 230 to join the configuration management instance.

In some implementations, member device 230 can be configured to join the configuration management instance based on a member device 230 initiated procedure. In some implementations, member device 230 can execute an OS-specific installer script. Additionally, or alternatively, the installer script can generate a token, and member device 230 can provide, to configuration management platform 220, information that identifies the token. In some implementations, client device 210 (e.g., which might have received an input from a user) can provide, to configuration management platform 220, information that identifies the token.

In some implementations, configuration management platform 220 can compare the token received from member device 230 and the token received from client device 210. In situations where the tokens match, configuration management platform 220 can provide, to member device 230, configuration information that enables member device 230 to join the configuration management instance.

In some implementations, CMS API module 410 can receive, from client device 210 via a web API, information associated with a request to configure the set of member devices 230. Additionally, or alternatively, CMS API module 410 can create a number of tasks associated with the request, and provide, to database module 420, information associated with the tasks. In some implementations, database module 420 can store information associated with the tasks and respective states associated with the tasks. Additionally, or alternatively, CMS API module 410 can provide, to client device 210 via a web API, information that identifies the states of the tasks (e.g., to notify the user that member devices 230 are being configured).

In some implementations, site state conductor module 430 can query database module 420 and identify a set of tasks associated with configuring the set of member devices 230. For example, site state conductor module 430 can identify tasks that are associated with particular states (e.g., pending) and instruct worker pool module 440 to execute the tasks. Additionally, or alternatively, worker pool module 440 can instruct driver module 450 to execute particular drivers that can configure member devices 230. As an example, driver module 450 can execute drivers that can configure member devices 230 associated with the particular type of configuration management software.

In some implementations, driver module 450 can provide, to container module 470 via container API module 460, an instruction to configure member devices 230. In some implementations, container modules 470, that are executing the containers, can provide configuration information to member devices 230. Additionally, or alternatively, database module 420 can update states associated with the set of tasks (e.g., from pending to complete). Additionally, or alternatively, CMS API module 410 can provide, to client device 210, information that identifies the updated states.

As further shown in FIG. 5, process 500 can include receiving information associated with a configuration management action to be performed in association with a member device, of the set of member devices, of the configuration management instance (block 540), and performing the configuration management action in association with a member device, of the set of member devices, after receiving the information associated with the configuration management action (block 550). For example, configuration management platform 220 can receive, from client device 210, information associated with configuration management actions to be performed as part of the configuration management service.

In some implementations, a configuration management action can refer to a task that can be performed in association with configuration management. In some implementations, a configuration management action can correspond to a command. For example, a command can refer to an instruction for member device 230. As particular examples, a command can correspond to modifying (e.g., installing, updating, uninstalling, etc.) software of member device 230, setting a password of member device 230, running an application on member device 230, modifying a configuration of member device 230, or the like.

In some implementations, configuration management platform 220 can receive, from client device 210, information associated with a command and arguments associated with the command. As a particular example, configuration management platform 220 can receive information associated with a command of changing a password of member device 230, and arguments to the command (i.e., the password). In some implementations, configuration management platform 220 can provide information associated with the command to the container that is executing the configuration management software associated with the configuration management instance. Additionally, or alternatively, the container can execute the command by providing, to member device(s) 230 of the configuration management instance, information associated with the command.

In some implementations, a configuration management action can correspond to declaring state information. For example, declaring state information can refer to the process of declaring, configuring and/or enforcing particular state information. In some implementations, state information can identify a particular configuration of member device 230 and/or can identify particular files to be installed on member device 230. For example, state information can identify a secure shell (SSH) protocol configuration, software to be installed on member device 230, a version of software, secure sockets layer (SSL) certificates to be installed on member device 230, OS settings, package installation, or the like.

In some implementations, client device 210 can provide state information to a version control repository. Additionally, or alternatively, configuration management platform 220 can create a repository to store state information, and enable client device 210 to access the version control repository. In some implementations, configuration management platform 220 can generate a set of keys that correspond to a set of users (e.g., users that are associated with an entity that is associated with the configuration management instance), and authorize the set of keys to be used to enable access upload, modification, etc. of state information to the version control repository.

In some implementations, CMS API module 410 can receive, from client device 210 via a web API, requests to perform configuration management actions. Additionally, or alternatively, CMS API module 410 can create a number of tasks associated with the request, and provide, to database module 420, information associated with the tasks. In some implementations, database module 420 can store information associated with the tasks and respective states associated with the tasks. Additionally, or alternatively, CMS API module 410 can provide, to client device 210 via a web API, information associated with the states of the tasks.

In some implementations, site state conductor module 430 can query database module 420 and identify a set of tasks associated with performing the configuration management actions. For example, site state conductor module 430 can identify tasks that are associated with particular states (e.g., pending) and instruct worker pool module 440 to execute the tasks. Additionally, or alternatively, worker pool module 440 can instruct driver module 450 to execute particular drivers that can perform the configuration management actions. As an example, driver module 450 can execute drivers that can perform the configuration management actions in association with member devices 230.

In some implementations, driver module 450 can provide, to container module 470 via container API module 460, an instruction to perform the configuration management actions. In some implementations, container modules 470, that are executing the containers, can provide instructions to member devices 230. Additionally, or alternatively, database module 420 can update states associated with the set of tasks (e.g., from pending to complete). Additionally, or alternatively, CMS API module 410 can provide, to client device 210, information associated with the updated states.

Some implementations herein provide configuration management platform 220 that can generate configuration management instances, configure member devices 230 to join the configuration management instances, and perform configuration management actions in association with the configuration management instances. Additionally, some implementations herein provide a framework of drivers that enable configuration management as a service to be provided in association with various types of configuration management software. In this way, some implementations herein improve security and reduce vulnerability of customer data as compared to situations where configuration management software is executed in multi-tenant environments.

Some implementations herein provide configuration management platform 220 that provides a framework for performing configuration management as service. For example, configuration management platform 220 can execute a set of drivers that are configured to interface with particular configuration management software. In this way, configuration management platform 220 can be configured with additional drivers, can be configured with updated drivers, can be configured to remove drivers, etc. based on new types of configuration management software, based on revisions to configuration management software, or the like. In this way, some implementations described herein reduce an amount of manual programming required to support new types of configuration management software, to support updated to configuration management software, or the like.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces and/or APIs have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be preconfigured to a standard configuration, a specific configuration based on a type of device on which the user interface is displayed, and/or a set of configurations based on capabilities and/or specifications associated with a device on which the user interface is displayed. While implementations herein describe particular user interfaces and/or APIs, it should be understood that other implementations include other user interfaces and/or APIs.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
receive a request to generate an entity-specific configuration management instance of a configuration management service;
generate the entity-specific configuration management instance based on the request,
the entity-specific configuration management instance to be executed by a site-specific container generated in response to the request;
allocate a set of network addresses to the site-specific container;

configure a set of member devices to be members of the entity-specific configuration management instance, the device being associated with a first entity,
the set of member devices to communicate with the site-specific container based on the set of network addresses,
the set of member devices being associated with a second entity that is different than the first entity,
the entity-specific configuration management instance being specific to the second entity, and
the first entity providing configuration management as a service;
receive information associated with a configuration management action to be performed in association with a member device, of the set of member devices, of the entity-specific configuration management instance; and
perform the configuration management action in association with the member device, of the set of member devices, after receiving the information associated with the configuration management action.

2. The device of claim 1, where the one or more processors are further to:
receive information associated with the member device of the set of member devices;
provide, to the member device, configuration information; and
where the one or more processors, when configuring the set of member devices, are to:
configure the set of member devices based on providing the configuration information to the member device, the configuration information to cause the member device to execute configuration management software and communicate with the device.

3. The device of claim 1, where the site-specific container is specific to a first site; and
where the one or more processors are further to:
generate another site-specific container, associated with the entity-specific configuration management instance, in association with a second site that is different than the first site,
the site-specific container and the other site-specific container to provide the configuration management service.

4. The device of claim 1, where the one or more processors are further to:
execute a command in association with the member device; and
where the one or more processors, when performing the configuration management action, are to:
perform the configuration management action based on executing the command.

5. The device of claim 1, where the one or more processors are further to:
declare a state associated with the member device; and
where the one or more processors, when performing the configuration management action, are to:
perform the configuration management action based on declaring the state.

6. The device of claim 1, where the one or more processors are further to:
identify a configuration management software to be used in association with the entity-specific configuration management instance based on the request to generate the entity-specific configuration management instance; and where the one or more processors, when configuring the set of member devices to be associated with the entity-specific configuration management instance, are to:
configure the set of member devices to execute the configuration management software.

7. The device of claim 1, where the one or more processors are further to:
receive information that identifies a region associated with the entity-specific configuration management instance; and
where the one or more processors, when generating the entity-specific configuration management instance, are to:
generate the entity-specific configuration management instance in association with the region.

8. A non-transitory computer-readable medium storing instructions, the instructions comprising:
one or more instructions that, when executed by one or more processors, cause the one or more processors to:
receive a request to generate an entity-specific configuration management instance of a configuration management service;
generate the entity-specific configuration management instance based on the request,
the entity-specific configuration management instance to be executed by a site-specific container generated in response to the request;
allocate a set of network addresses to the site-specific container;
configure a set of member devices to be members of the entity-specific configuration management instance,
wherein the set of member devices are to communicate with the site-specific container based on the set of network addresses;
receive information associated with a configuration management action to be performed in association with a member device, of the set of member devices, of the entity-specific configuration management instance; and
perform the configuration management action in association with the member device, of the set of member devices, after receiving the information associated with the configuration management action.

9. The non-transitory computer-readable medium of claim 8, where the one or more instructions, when executed by the one or more processors, further cause the one or more processors to:
receive information associated with a set of device identifiers that correspond to the set of member devices; and
where the one or more instructions, that cause the one or more processors to configure the set of member devices, cause the one or more processors to:
configure the set of member devices after receiving the information associated with the set of device identifiers.

10. The non-transitory computer-readable medium of claim 8, where the configuration management service is associated with a first entity, and
where the set of member devices are associated with a second entity that is different than the first entity,
the entity-specific configuration management instance being associated with the second entity.

11. The non-transitory computer-readable medium of claim 8, where the one or more instructions, when executed by the one or more processors, further cause the one or more processors to:

receive information associated with a region associated with the entity-specific configuration management instance; and where the one or more instructions, that cause the one or more processors to generate the entity-specific configuration management instance, cause the one or more processors to:
generate the entity-specific configuration management instance in association with the region.

12. The non-transitory computer-readable medium of claim 8,
where the one or more instructions, that cause the one or more processors to generate the configuration management instance, cause the one or more processors to:
generate the entity-specific configuration management instance based on generating the site-specific container.

13. The non-transitory computer-readable medium of claim 8, where the configuration management action corresponds to executing a command in association with the set of member devices.

14. The non-transitory computer-readable medium of claim 8, where the one or more instructions, when executed by the one or more processors, further cause the one or more processors to:
generate another configuration management instance after generating the entity-specific configuration management instance,
the other configuration management instance being a copy of the entity-specific configuration management instance.

15. A method, comprising:
receiving, by a device, a request to generate an entity-specific configuration management instance of a configuration management service,
the request specifying a particular type of configuration management software;
generating, by the device, the entity-specific configuration management instance based on the request,
the entity-specific configuration management instance to be executed by a site-specific container generated in response to the request;
allocating, by the device, a set of network addresses to the site-specific container;
configuring, by the device, a set of member devices to be members of the entity-specific configuration management instance,
wherein the set of member devices are to communicate with the site-specific container based on the set of network addresses;
receiving, by the device, information associated with a configuration management action to be performed in association with a member device, of the set of member devices, of the entity-specific configuration management instance; and
performing, by the device, the configuration management action in association with the member device, of the set of member devices, after receiving the information associated with the configuration management action.

16. The method of claim 15, further comprising:
providing, to the set of member devices, configuration information that causes the set of member devices to install configuration management software; and
where configuring the set of member devices comprises:
configuring the set of member devices based on providing the configuration information.

17. The method of claim 15, further comprising:
receiving information that identifies a region associated with the entity-specific configuration management instance; and
where generating the entity-specific configuration management instance comprises:
generating the entity-specific configuration management instance based on the region.

18. The method of claim 15,
where generating the entity-specific configuration management instance comprises:
generating the entity-specific configuration management instance after generating the site-specific container.

19. The method of claim 15, further comprising:
modifying a setting of the set of member devices; and
where performing the configuration management action comprises:
performing the configuration management action based on modifying the setting.

20. The method of claim 15, further comprising:
declaring a state associated with the member device; and
performing the configuration management action based on declaring the state.

* * * * *